(12) United States Patent
Gerdin et al.

(10) Patent No.: US 8,825,267 B2
(45) Date of Patent: Sep. 2, 2014

(54) USE OF SUSPENSION INFORMATION IN TIRE PRESSURE DEVIATION DETECTION FOR A VEHICLE TIRE

(75) Inventors: Markus Gerdin, Västra Frölunda (SE); Henrik Nilsson, Mölndal (SE); Tony Gustafsson, Askim (SE); Mats Löfgren, Mölndal (SE)

(73) Assignee: Nira Dynamics AB, Linkoping (SE)

( * ) Notice: Subject to any disclaimer, the term of this patent is extended or adjusted under 35 U.S.C. 154(b) by 1286 days.

(21) Appl. No.: 12/531,689

(22) PCT Filed: Mar. 16, 2007

(86) PCT No.: PCT/EP2007/002365
§ 371 (c)(1),
(2), (4) Date: Jun. 7, 2011

(87) PCT Pub. No.: WO2008/113377
PCT Pub. Date: Sep. 25, 2008

(65) Prior Publication Data
US 2011/0231051 A1    Sep. 22, 2011

(51) Int. Cl.
*B60C 23/00* (2006.01)

(52) U.S. Cl.
USPC ............ 701/29; 701/36; 701/37; 701/29.1; 701/33.7; 73/146; 340/438; 340/442; 340/443

(58) Field of Classification Search
None
See application file for complete search history.

(56) References Cited

U.S. PATENT DOCUMENTS

| | | | | |
|---|---|---|---|---|
| 5,218,862 A * | 6/1993 | Hurrell et al. | ............... | 73/146.5 |
| 5,461,564 A * | 10/1995 | Collins et al. | ............... | 701/37 |
| 5,604,482 A * | 2/1997 | Majeed et al. | ............... | 340/442 |
| 5,670,872 A * | 9/1997 | Van De Walle et al. | ...... | 324/171 |
| 6,036,179 A * | 3/2000 | Rensel | ............... | 267/64.11 |
| 6,161,419 A * | 12/2000 | Langlechner | ............... | 73/11.08 |
| 6,182,021 B1 * | 1/2001 | Izumi et al. | ............... | 702/138 |
| 6,293,562 B1 * | 9/2001 | Kutscher | ............... | 280/6.159 |
| 6,313,742 B1 * | 11/2001 | Larson | ............... | 340/442 |
| 6,385,553 B1 | 5/2002 | Naito et al. | | |
| 6,691,002 B2 * | 2/2004 | Dormegnie et al. | ............... | 701/1 |
| 6,725,136 B2 * | 4/2004 | Lutz et al. | ............... | 701/33.4 |
| 6,731,205 B2 * | 5/2004 | Schofield et al. | ............... | 340/444 |
| 6,914,523 B2 * | 7/2005 | Munch et al. | ............... | 340/447 |
| 6,923,050 B2 * | 8/2005 | Levy et al. | ............... | 73/146 |
| 7,111,507 B2 | 9/2006 | Fennel et al. | | |

(Continued)

FOREIGN PATENT DOCUMENTS

| | | |
|---|---|---|
| DE | 10360723 A1 | 7/2005 |
| EP | 1502775 A1 | 2/2005 |

(Continued)

OTHER PUBLICATIONS

PCT/EP2007/002365, International Search Report and Written Opinion, mailed on Dec. 4, 2007. 12 pgs.

*Primary Examiner* — Jonathan M Dager
(74) *Attorney, Agent, or Firm* — Blakely, Sokoloff, Taylor & Zafman LLP

(57) ABSTRACT

A method, system and computer program product for detecting a tire pressure deviation in a tire of a vehicle by determining tire pressure indicating data indicative of a tire pressure condition of the tire and determining tire pressure deviation data indicative of a tire pressure deviation in the tire.

6 Claims, 7 Drawing Sheets

(56) References Cited

U.S. PATENT DOCUMENTS

Figure 1:
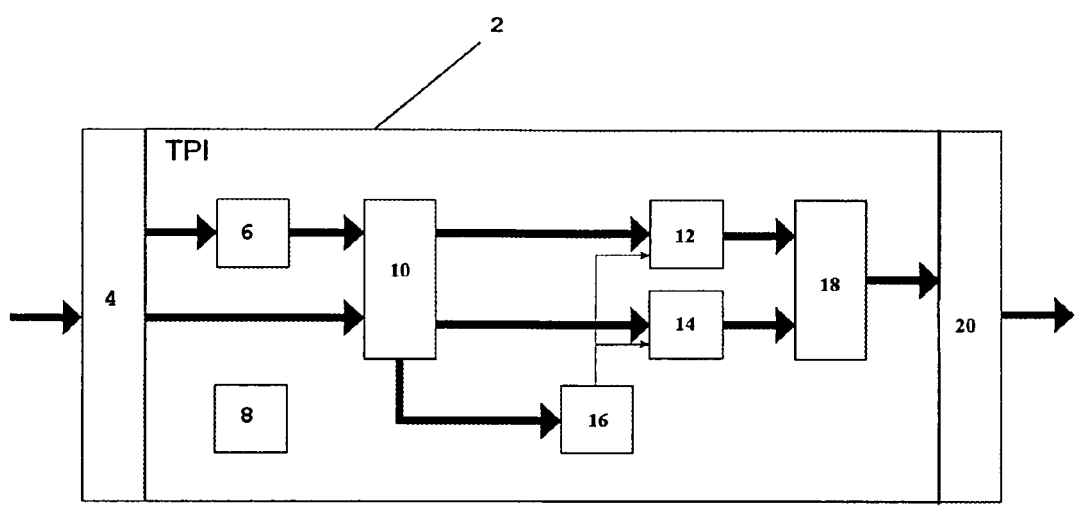

| | | | |
|---|---|---|---|
| 7,205,886 B2* | 4/2007 | Kin | 340/442 |
| 7,248,953 B2* | 7/2007 | Ogawa | 701/30.2 |
| 7,263,458 B2* | 8/2007 | Hall et al. | 702/138 |
| 7,426,431 B2* | 9/2008 | Fangeat et al. | 701/48 |
| 7,512,467 B2* | 3/2009 | Watabe | 701/34.4 |
| 7,515,039 B2* | 4/2009 | Casey et al. | 340/442 |
| 7,522,032 B2* | 4/2009 | Nakao | 340/444 |
| 7,884,708 B2* | 2/2011 | Honkonen et al. | 340/444 |
| 7,912,604 B2* | 3/2011 | Oshiro | 701/37 |
| 7,946,163 B2* | 5/2011 | Gartner | 73/117.03 |
| 8,290,662 B2* | 10/2012 | Wang et al. | 701/36 |
| 8,397,559 B2* | 3/2013 | Fischer et al. | 73/146.5 |
| 8,554,498 B2* | 10/2013 | Gustavsson et al. | 702/50 |
| 2002/0059826 A1* | 5/2002 | Ono et al. | 73/146.5 |
| 2002/0111718 A1* | 8/2002 | Dormegnie et al. | 701/1 |
| 2002/0194904 A1* | 12/2002 | Kawasaki et al. | 73/146 |
| 2003/0121319 A1* | 7/2003 | Kojima et al. | 73/146.2 |
| 2003/0172728 A1 | 9/2003 | Gustafsson et al. | |
| 2003/0236603 A1* | 12/2003 | Lu | 701/37 |
| 2004/0196149 A1* | 10/2004 | Dufournier | 340/443 |
| 2004/0225423 A1* | 11/2004 | Carlson et al. | 701/36 |
| 2004/0260436 A1* | 12/2004 | Kin | 701/29 |
| 2005/0040941 A1* | 2/2005 | Schofield et al. | 340/442 |
| 2005/0081616 A1* | 4/2005 | Suzuki et al. | 73/146 |
| 2006/0267750 A1 | 11/2006 | Lu et al. | |
| 2007/0061100 A1* | 3/2007 | Hall et al. | 702/140 |
| 2007/0138865 A1* | 6/2007 | Amato | 303/191 |
| 2007/0156312 A1* | 7/2007 | Breed et al. | 701/29 |
| 2008/0001728 A1* | 1/2008 | Dufournier | 340/444 |
| 2008/0024286 A1 | 1/2008 | Perras | |
| 2008/0255744 A1* | 10/2008 | Yasui et al. | 701/70 |
| 2010/0191483 A1* | 7/2010 | Gustavsson et al. | 702/50 |
| 2010/0198527 A1* | 8/2010 | Gouriet et al. | 702/33 |
| 2013/0180324 A1* | 7/2013 | Sota et al. | 73/146 |

FOREIGN PATENT DOCUMENTS

| | | |
|---|---|---|
| EP | 1612062 A2 | 1/2006 |
| JP | 09196791 | 7/1997 |
| WO | WO2005/005993 A1 | 7/2003 |

* cited by examiner

USE OF SUSPENSION INFORMATION IN TIRE PRESSURE DEVIATION DETECTION FOR A VEHICLE TIRE

CROSS-REFERENCE TO RELATED APPLICATION

This patent application is a U.S. National Phase application under 35 U.S.C. §371 of International Application No. PCT/EP2007/002365, filed on Mar. 16, 2007, entitled USE OF SUSPENSION INFORMATION IN TIRE PRESSURE DEVIATION DETECTION FOR A VEHICLE TIRE.

FIELD OF THE INVENTION

The present invention is directed to an indirect tire pressure monitoring method, system and computer program product, wherein information concerning suspension means and/or systems acting on tires of a vehicle is used in optimizing monitoring tire pressure in tires of the vehicle.

BACKGROUND OF THE INVENTION

Monitoring of tire pressure can be assumed to become a standard functionality in vehicles, at least in cars and trucks, not only due to governmental and legal regulations but also in view of a general demand for enhanced vehicle safety.

Generally, tire pressure monitoring can be accomplished directly and indirectly.

In direct tire pressure monitoring, a current pressure in a vehicle tire is directly measured, e.g. by means of a sensor arranged inside the tire. An example for direct tire pressure monitoring is described, e.g., in U.S. Pat. No. 7,111,507 B2.

Indirect tire pressure monitoring uses information, which—in contrast to directly obtained pressure values—is somehow related to the tire pressure. Commonly, such information may be provided by further control and/or detection devices of vehicles, such as ECUs (electronic control unit), antilock braking systems, dynamic stability systems, antispin systems and traction control systems, in form of digital and/or analog data and/or signals. The information may include the rotational speed or angular velocity of the tire or its wheel, respectively, which information is then used as basis to calculate or estimate a value representing tire pressure. An example for indirect tire pressure monitoring is described, e.g., in DE 103 60 723 A1.

Particularly indirect tire pressure monitoring requires complex computation and calculation to derive tire pressure from pressure related information. Moreover, the connection between pressure related information and tire pressure is prone to external influences, such as current driving situations and road conditions.

Also, vehicle specific conditions may influence tire pressure and information related thereto. For example, current conditions of suspension means or system(s) of a vehicle may affect tire pressure and, thus, results of tire pressure monitoring. This is particularly possible for indirect tire pressure monitoring.

OBJECT OF THE INVENTION

The object of present invention is to provide means improving indirect tire pressure monitoring to overcome the drawbacks of prior art with respect to influences that may affect tire pressure and, particularly, such that resulting tire pressure indicating information at least essentially corresponds to an actually prevailing tire pressure.

SUMMARY OF THE INVENTION

To solve the above object, the present invention provides a method, a system and a computer program product as defined in the independent claims.

According to a first aspect the present invention provides an indirect tire pressure monitoring method of detecting tire pressure deviation in tire(s) of a vehicle, comprising the steps of:
  determining tire pressure indicating data indicative of a tire pressure condition of at least one tire of a vehicle;
  determining tire pressure deviation data indicative of a tire pressure deviation condition in the at least one tire on the basis of the tire pressure indicating data;
  obtaining at least one vehicle data provided by a controlling and/or monitoring device of the vehicle;
  determining suspension related data on the basis of the at least one vehicle data; and
  suspension related compensating on the basis of the suspension related data such that suspension compensated tire pressure deviation data is achieved.

According to another aspect, the present invention provides an indirect tire pressure monitoring system for detecting tire pressure deviation in tire(s) of a vehicle, comprising:
  means for determining tire pressure indicating data indicative of a tire pressure condition of at least one tire of a vehicle;
  means for determining tire pressure deviation data indicative of a tire pressure deviation condition in the at least one tire on the basis of the tire pressure indicating data;
  means for obtaining at least one vehicle data provided by a controlling and/or monitoring device of the vehicle;
  means for determining suspension related data on the basis of the at least one vehicle data; and
  means for suspension related compensating on the basis of the suspension related data such that suspension compensated tire pressure deviation data is achieved.

According to a further aspect, the present invention provides a computer program product for an indirect tire pressure monitoring for detecting tire pressure deviation in tire(s) of a vehicle, the computer program product comprising program code for carrying out, when executed on a processing system, the steps of:
  determining tire pressure indicating data indicative of a tire pressure condition of at least one tire of a vehicle;
  determining tire pressure deviation data indicative of a tire pressure deviation condition in the at least one tire on the basis of the tire pressure indicating data;
  obtaining at least one vehicle data provided by a controlling and/or monitoring device of the vehicle;
  determining suspension related data on the basis of the at least one vehicle data; and
  suspension related compensating on the basis of the suspension related data such that suspension compensated tire pressure deviation data is achieved.

Further aspects, features and advantages of the present invention will become apparent from the below description, the accompanying drawings and the appended claims.

SHORT DESCRIPTION OF THE DRAWINGS

Figure 2:
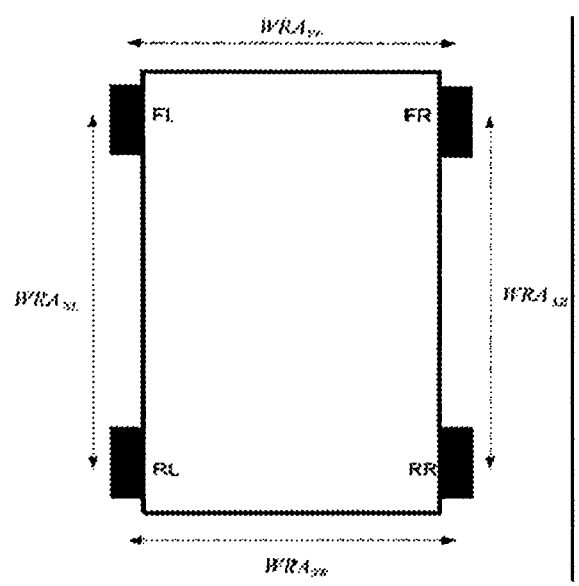
Figure 3:
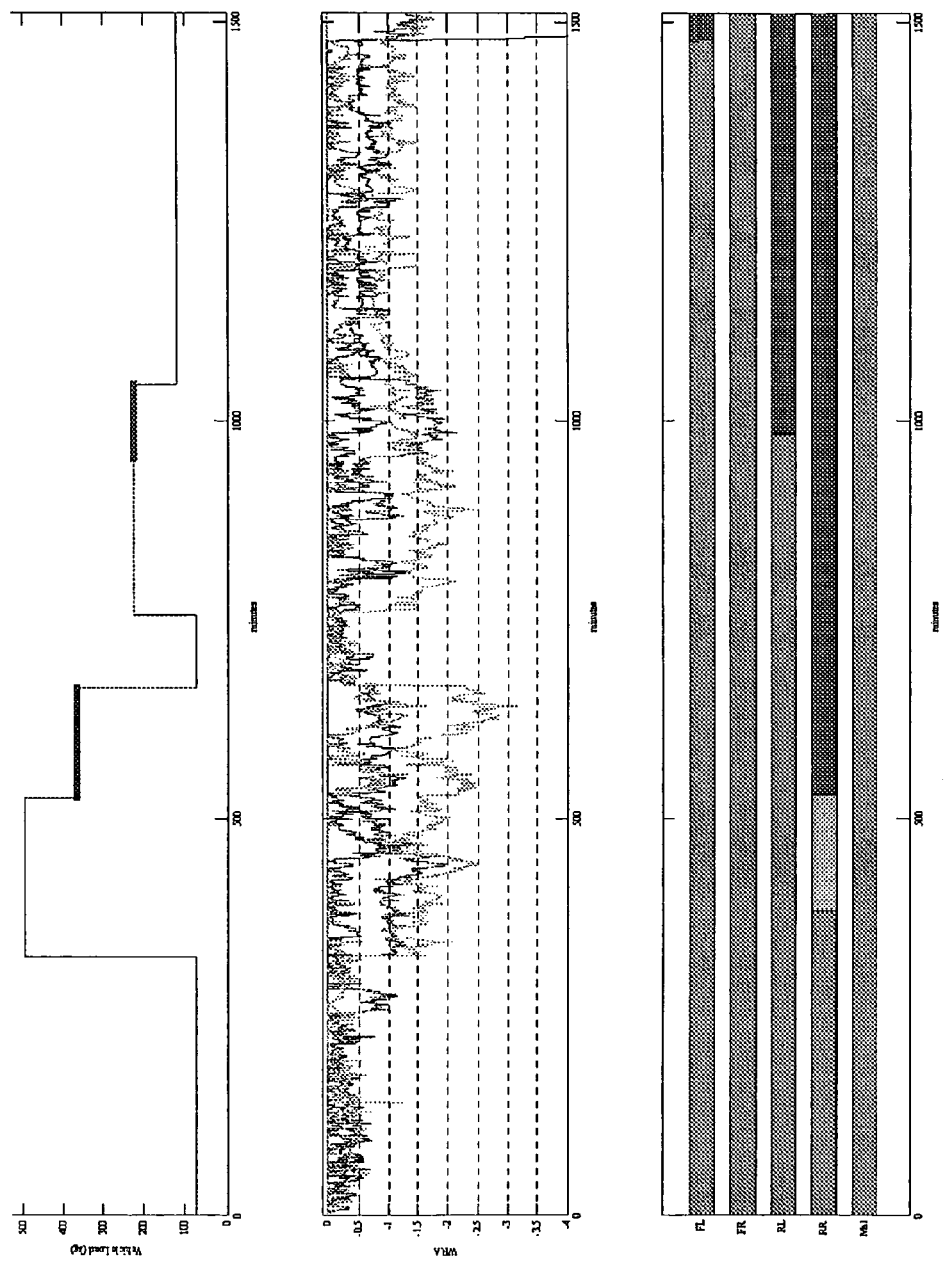
Figure 4:
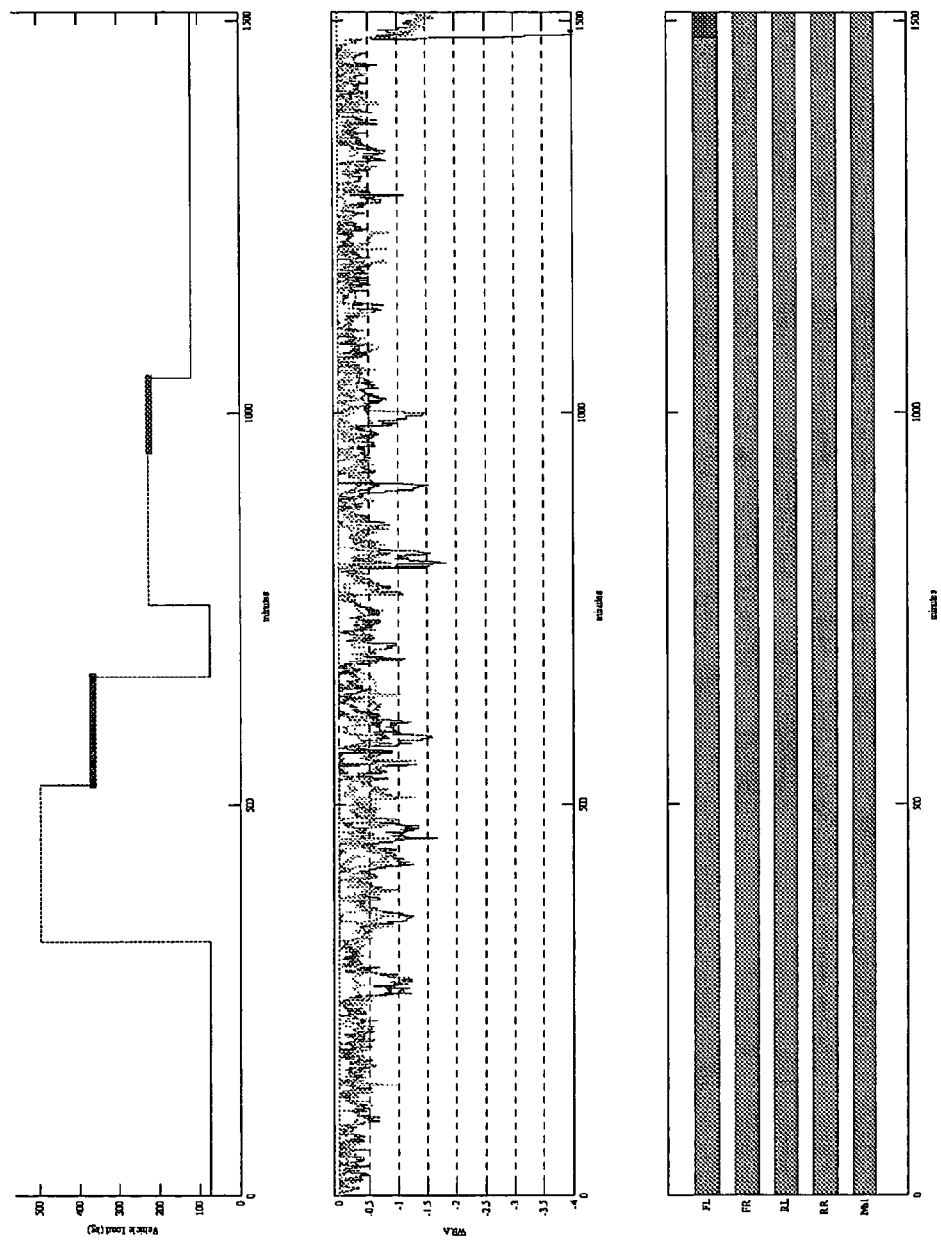
Figure 5:
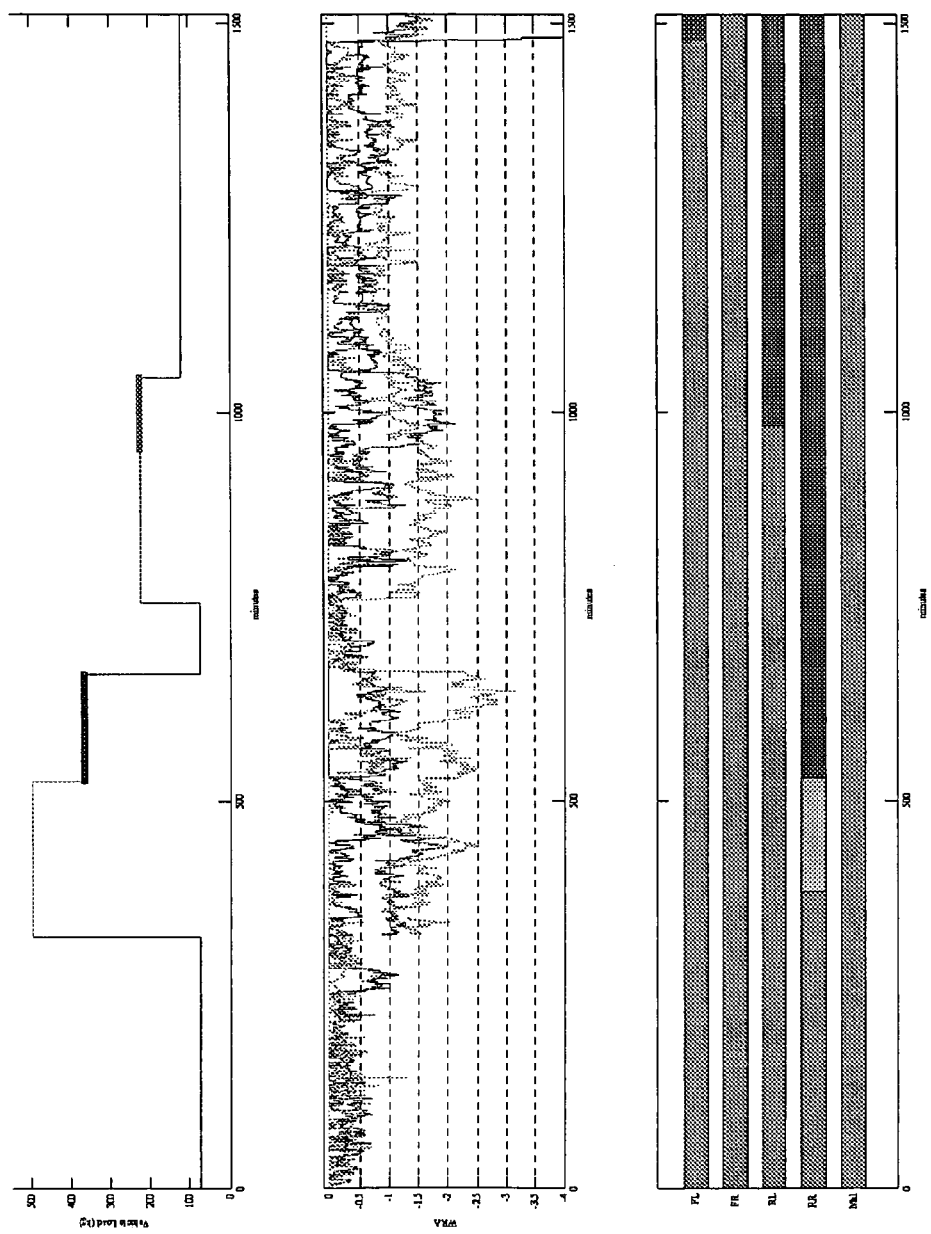
Figure 6:
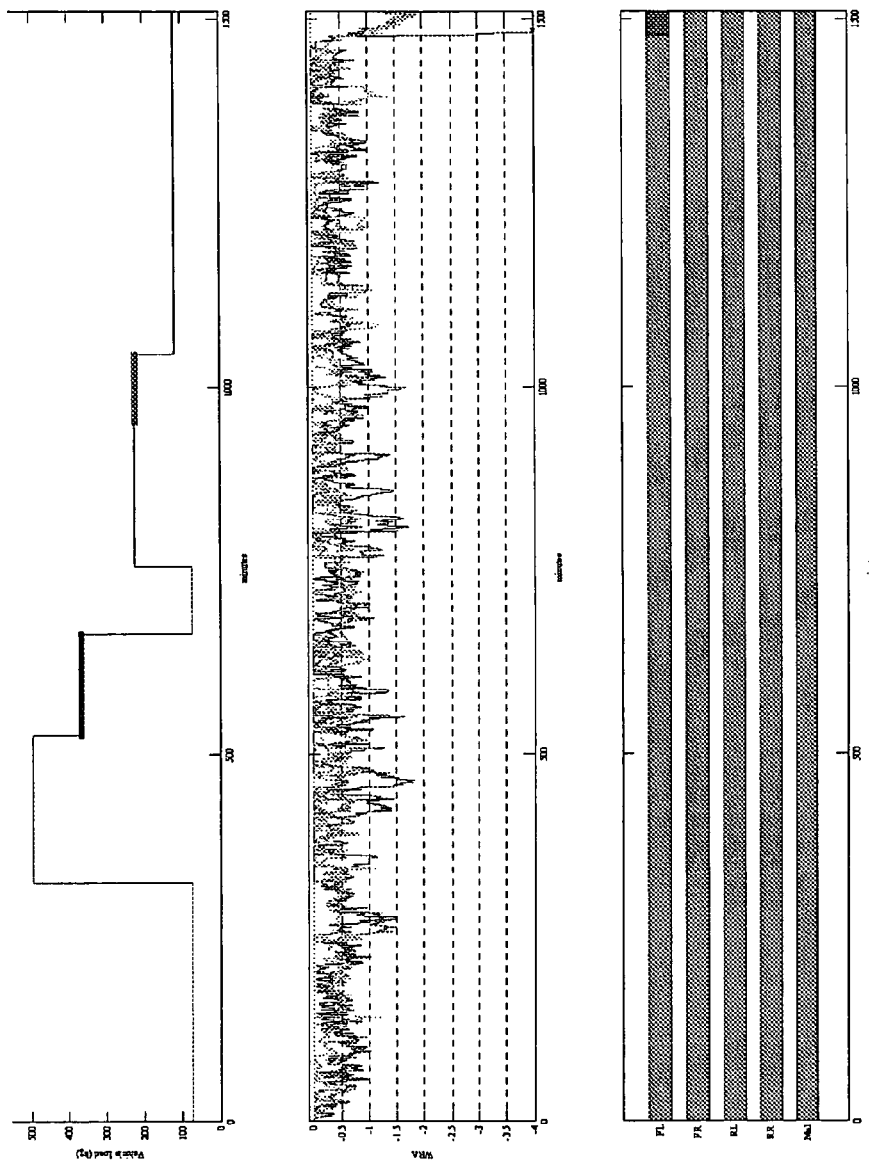
Figure 7:
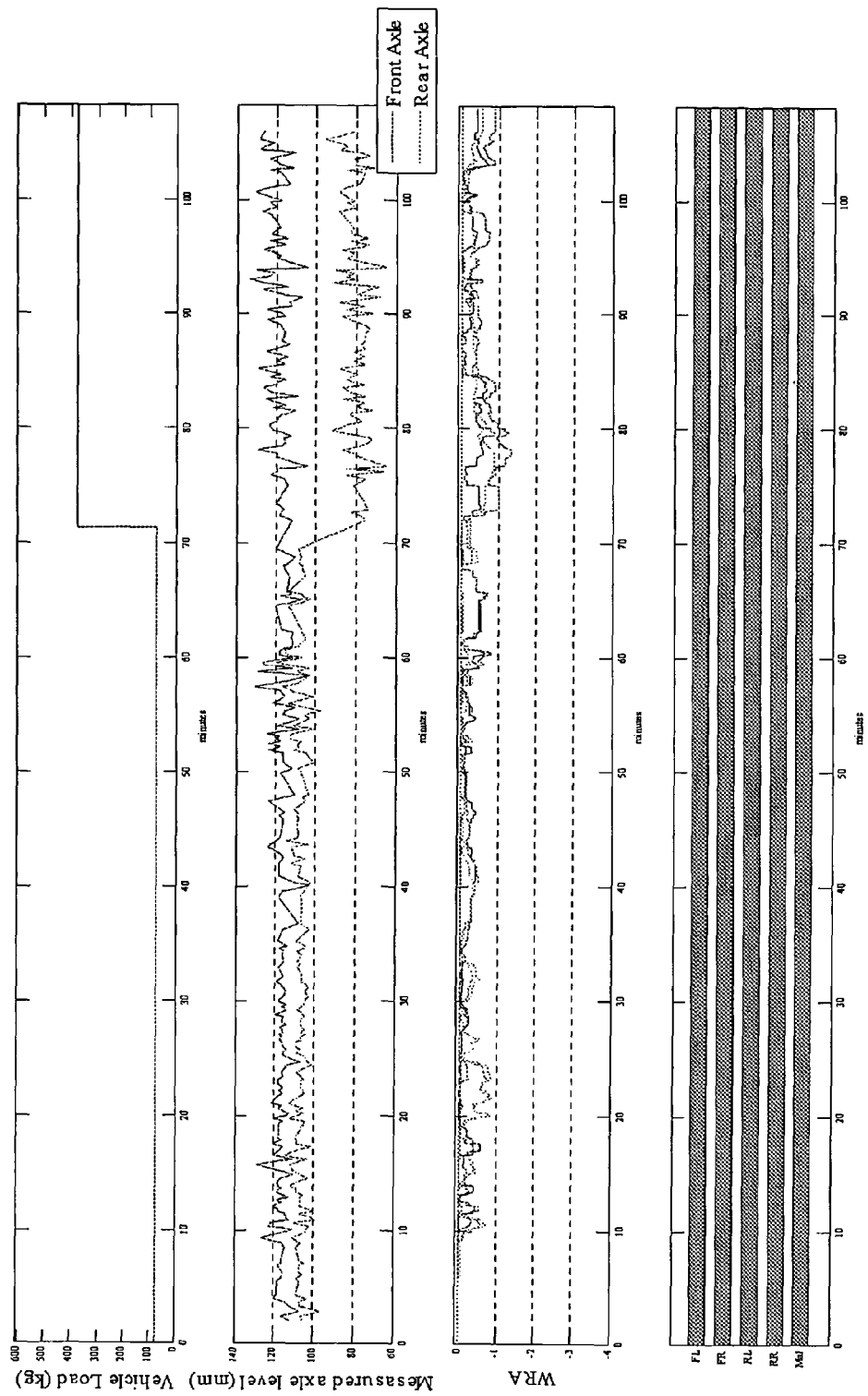

Embodiments of the invention will now be described, by way of example and with reference to the accompanying drawings, in which:

FIG. 1 schematically illustrates a principle system arrangement according to an embodiment of the present invention;

FIG. 2 is a schematical illustration to support explanation of roll radius based on indirect tire pressure monitoring according to an embodiment of the present invention;

FIGS. 3 and 4 include graphs showing tire pressure monitoring results without and with suspension related compensation according to the present invention wherein suspension compensation is continuously performed;

FIGS. 5 and 6 include graphs showing tire pressure monitoring results without and with suspension related compensation according to the present invention wherein suspension compensation is performed during periods of time where suspension control is active; and FIG. 7 includes graphs showing tire pressure monitoring results without and with suspension related compensation according to the present invention wherein suspension compensation is based on vehicle level information from sensors for headlight positioning.

DESCRIPTION OF PREFERRED EMBODIMENTS

FIG. 1 schematically illustrates a principle system arrangement according to the present invention, particularly in form of a tire pressure deviation (TPD) warning system 2 using indirect tire pressure monitoring.

The present invention is provided for use in any kind of vehicle having at least one wheel equipped with at least one tire. The term "vehicle" as used herein comprises any type of vehicle, such as cars, bikes, trucks, trailers, and the like, where information on the basis of which indirect tire pressure monitoring is possible.

A "pressure deviation" in a tire may be detected if the tire pressure actually determined for the tire differs from a normal/predefined/desired tire pressure and/or differs from the pressure of one or more other tires by a predetermined threshold value.

However, before continuing with descriptions of the drawings, some further observations to further aspects of the present invention are given. More detailed observation to the method related aspects of the present invention also apply to corresponding system related aspects and computer program related aspects of the present invention even if not explicitly noted.

The method of the present invention may include that the step of suspension related compensating comprises a step of suspension related compensating the tire pressure indicating data on the basis of the suspension related data such that suspension compensated tire pressure deviation data is achieved.

In such embodiments, suspension compensation may used to compensate data indicating tire pressure of individual tire(s) (e.g. tire pressure derived from wheel/tire spectrum analysis) and/or data indicating relative tire pressure with respect to at least one two tires (e.g. relative tire pressure roll derived from radius based tire pressure monitoring such as wheel radius analysis).

The method of the present invention may include that
the step of determining tire pressure deviation data comprises a step of determining individual tire pressure deviation data for each of the at least one tire; and
the step of suspension related compensating is carried out with respect to each of individual tire pressure deviation data to achieve suspension compensated tire pressure deviation data separately for each of the at least one tire.

Such embodiments are, e.g., applicable where a vehicle and/or the used tire pressure monitoring means provide and compute, respectively, information on absolute pressure of individual tires. An example for such cases is the below described embodiment using wheel/tire spectrum analysis.

The method of the present invention may include that
the step of determining tire pressure deviation data comprises a step of determining relative tire pressure deviation data for at least two tires of the vehicle, on the basis of roll radius based indirect tire pressure monitoring; and
the step of suspension related compensating is carried out with respect to each of the at least one relative tire pressure deviation data to achieve suspension compensated tire pressure deviation data for the at least two tires.

Such embodiments are, e.g., applicable where a vehicle and/or the used tire pressure monitoring means provide and compute, respectively, information on relative pressure of tires. It is noted that information on relative tire pressure may be based on information on absolute tire pressure as above. Examples for such cases include the below described embodiment using radius based tire pressure monitoring (e.g. wheel radius analysis) and correlation analysis such as, e.g., disclosed in WO 2005/005993 A1, the entire content of which being incorporated in the present disclosure by reference.

Such embodiments allow, e.g., to take into account that the at least one vehicle data, a respective signal providing vehicle device, the step of determining pressure indicating data, the step of determining tire pressure deviation data, the step of determining suspension related data, the step of suspension related compensating and/or means used to carry out such steps may have suspension dependent characteristics, which may require compensation in view of (current and/or future) suspension condition(s). An example for this is the below described embodiment, wherein vehicle data, vehicle data providing units, determination of tire pressure indicating data and/or determination of tire pressure deviation data may have suspension dependent performance(s).

The method of the present invention may include that the at least one vehicle data includes at least one of
vehicle data indicative of suspension height information related to at least one of the at least one tire;
vehicle data indicative of suspension stiffness acting on at least one of the at least one tire;
vehicle data indicative of at least one of current and future control measures of extension and/or height of suspension means acting on at least one of the at least one tire;
vehicle data indicative of operation of a semi-active or active suspension control system of the vehicle;
vehicle data indicative of suspension pressure and/or force acting on at least one of the at least one tire;
vehicle data indicative of at least one of a lateral acceleration and a longitudinal acceleration of the vehicle (e.g. including at least one x, y, z position; roll; pitch information on the vehicle; e.g. obtained from a so-called three-dimensional inertial measurement unit 3D IMU);
vehicle data indicative of a yaw rate of the vehicle;
vehicle data indicative of a speed of the vehicle;
vehicle data indicative of a steering wheel angle of a steering wheel of the vehicle;
vehicle data indicative of at least one of positioning, orientation and emission direction of at least one head light of the vehicle;
vehicle data indicative of a driving condition of the vehicle, particularly a braking condition;
vehicle data indicative that a braking system of the vehicle is operating (e.g. a brake active flag);

vehicle data indicative of brake pressure;
vehicle data indicative that at least one active control device of the vehicle is active;
vehicle data indicative of ambient temperature;
vehicle data indicative of an engine torque of an engine of the vehicle;
vehicle data indicative of a torque acting on the at least one tire;
vehicle data indicative of wheel slip related to the at least one tire;
vehicle data indicative of an engine speed of an engine of the vehicle; and
vehicle data indicative that a gear shift of the vehicle is in progress.

The method of the present invention may include that the step of suspension related compensating comprises a step of suspension related compensating the at least one vehicle data on the basis of the suspension related data.

In such embodiments, at least those suspension related impacts that affect the at least one vehicle data itself may be directly compensated.

It is further possible that the step of obtaining the at least one vehicle data comprises a step of obtaining data from at least one of:
a 3D position sensor;
a velocity sensor;
an acceleration sensor;
a wheel/tire sensor;
a yaw rate sensor;
a torque sensor;
a suspension (related) sensor; and
temperature sensor.

A sensor may include one ore more separate sensor units, wherein a sensor unit may be hardware-based or software-based or a combination thereof.

The method of the present invention may include that the step of suspension related compensating comprises a step of suspension related compensating the tire pressure indicating data on the basis of the suspension related data.

Such embodiments, e.g., may include to suspension related compensate wheel/tire radii and/or spectra derived from tire pressure indicating data as described further below.

The method of the present invention may include that the step of suspension related compensating comprises a step of suspension related compensating the tire pressure deviation data itself on the basis of the suspension related data.

Such embodiments may only rely on suspension effects, impacts, etc. on the tire pressure deviation data itself. Such embodiments may additionally include at least one of above described suspension related compensation, possibly resulting in an enhanced, more reliable and/or correct suspension related compensation and, thus, monitoring of tire pressure.

The method of the present invention may further comprise a step of comparing the tire pressure deviation data with deviation threshold data to determine whether the tire pressure deviation condition exceeds at least one predefined deviation related threshold.

Embodiments of this kind provide, e.g., measure(s) to ascertain whether the tire pressure deviation data indicate a tire pressure deviation being to high, unacceptable or the like.

Here, the method of the present invention may further comprise a step of correcting the deviation threshold data on the basis of the suspension related data.

Such embodiments consider that also the deviation threshold data might have a suspension related dependency that could be (also) compensated. Further, it might be beneficial to modify the deviation threshold data in dependence of the actual suspension condition(s) such that in certain (e.g. excessive) suspension condition(s) reliable statements on tire pressure and/or tire pressure deviation are (still) possible.

The method of the present invention may further comprise a step of pausing at least one of the steps of the step of determining tire pressure indicating data, the step of determining tire pressure deviation data, the step of obtaining at least one vehicle data, the step of determining suspension related data and the step of suspension related compensating in the case the suspension related data indicate a suspension condition outside a predefined range and resuming the at least one of said steps in the case the suspension related data indicate a suspension condition back in the predefined range.

Such embodiments allow, e.g., to stop carrying out the method of the present invention in cases of suspension condition(s) that hinder a reliable determination of tire pressure deviation data and/or statements on tire pressure and/or tire pressure deviation based thereon.

In the system of the present invention it is possible that the means for suspension related compensating is adapted to suspension related compensate the tire pressure indicating data on the basis of the suspension related data such that suspension compensated tire pressure deviation data is achieved.

In the system of the present invention it is possible that
the means for determining tire pressure deviation data is adapted to determine individual tire pressure deviation data for each of the at least one tire (e.g. on the basis of wheel spectrum analysis); and
the means for suspension related compensating is adapted to separately compensate with respect to the individual tire pressure deviation data on the basis of the suspension related data to achieve suspension compensated tire pressure deviation data for each of the at least one tire.

In the system of the present invention it is possible that
the means for determining tire pressure deviation data is adapted to determine relative tire pressure deviation data for at least two tires of the vehicle (e.g. based on roll radius based indirect tire pressure monitoring, wheel/tire radius analysis and/or correlation analysis); and
the means for suspension related compensating is adapted to compensate with respect to the relative tire pressure deviation data on the basis of the suspension related data to achieve suspension compensated tire pressure deviation data for the at least two tires.

The system of the present invention may further include at least one input for obtaining, as the least one vehicle data, at least one of
vehicle data indicative of suspension height information related to at least one of the at least one tire;
vehicle data indicative of suspension stiffness acting on at least one of the at least one tire;
vehicle data indicative of at least one of current and future control measures of extension and/or height of suspension means acting on at least one of the at least one tire;
vehicle data indicative of operation of a semi-active or active suspension control system of the vehicle;
vehicle data indicative of suspension pressure and/or force acting on at least one of the at least one tire;
vehicle data indicative of at least one of a lateral acceleration and a longitudinal acceleration of the vehicle (e.g. including at least one x, y, z position; roll; pitch information on the vehicle; e.g. obtained from a so-called three-dimensional inertial measurement unit 3D IMU);
vehicle data indicative of a yaw rate of the vehicle;
vehicle data indicative of a speed of the vehicle;

vehicle data indicative of a steering wheel angle of a steering wheel of the vehicle;

vehicle data indicative of at least one of positioning, orientation and emission direction of at least one head light of the vehicle;

vehicle data indicative of a driving condition of the vehicle, particularly a braking condition;

vehicle data indicative that a braking system of the vehicle is operating (e.g. a brake active flag);

vehicle data indicative of brake pressure;

vehicle data indicative that at least one active control device of the vehicle is active;

vehicle data indicative of ambient temperature;

vehicle data indicative of an engine torque of an engine of the vehicle;

vehicle data indicative of a torque acting on the at least one tire;

vehicle data indicative of wheel slip related to the at least one tire;

vehicle data indicative of an engine speed of an engine of the vehicle; and vehicle data indicative that a gear shift of the vehicle is in progress.

In the system of the present invention it is possible that the means for determining the data is adapted to compute the least one vehicle data to calculate or estimate the suspension related data.

In the system of the present invention it is possible that the means for suspension related compensating is adapted to compensate the at least one vehicle data based on the suspension related data.

Here, it is further possible that the means for the at least one vehicle data is adapted to obtain vehicle data of at least one of:

a 3D position sensor;

a velocity sensor;

an acceleration sensor;

a wheel/tire sensor;

a yaw rate sensor;

a torque sensor;

a suspension (related) sensor; and temperature sensor.

A sensor may include one ore more separate sensor units, wherein a sensor unit may be hardware-based or software-based or a combination thereof.

In the system of the present invention it is possible that the means for suspension related compensating is adapted to compensate the tire pressure indicating data on the basis of the suspension related data.

In the system of the present invention it is possible that the means for suspension related compensating is adapted to compensate the tire pressure deviation data itself on the basis of the suspension related data.

The system of the present invention may further comprise means for comparing the tire pressure deviation data with deviation threshold data and for determining based on the comparison result whether the tire pressure deviation condition exceeds at least one predefined deviation related threshold.

Here, the system of the present invention may further comprise means for correcting the deviation threshold data on the basis of the suspension related data.

The system of the present invention may further comprise means for disabling at least one of the means for determining tire pressure indicating data, the means for determining tire pressure deviation data, the means for obtaining at least one vehicle data, the means for determining suspension related data and the means for suspension compensating in the case the temperature compensation data indicate a suspension condition or situation outside a predefined range and enabling the at least one of said means in the case the suspension related data indicate a suspension condition or situation back in the predefined range.

The computer program product of the present invention may further comprise program code for carrying out, when executed on a processing system, the steps of at least one of the above-mentioned possible embodiments of the method of the present invention.

The computer program product of the present invention may be stored on a computer-readable storage medium or in a computer-readable storage device.

In indirect tire pressure monitoring both the detection performance and the robustness against false warnings can be improved if suspension information is used. This is particularly interesting in vehicles with adjustable and/or (semi-)active suspensions. One example of a problem that can occur is that vehicle's center of gravity (CoG) will move vertically if the height of the suspension is changed with load shifts between the axles as a result. This in turn results in different normal forces acting on the wheels/tires and different wheel slip, in particular in high speed, which may cause false under inflation warnings. Another problem is that many (semi-)active suspensions, typically air suspensions, will adjust the height of individual suspension legs to control the car body level in different driving situations and with load changes. This can lead to false warnings both in systems relying on wheel radius comparisons and wheel vibration and other if not compensated for. A third aspect is if the stiffness of the suspension changes which may lead to similar problems and false warnings.

Air suspensions can adjust applied normal force(s) on each wheel/tire individually in order to keep the vehicle body, e.g., horizontal. In roll radius based indirect tire pressure monitoring, it is assumed that the normal force is a substantially fixed parameter and roll radius based indirect tire pressure monitoring can therefore be misled by the air suspension and cause robustness problems. For example, in case the vehicle is parked with one or several wheels in a pot-hole before calibration is initiated, this may result in an insufficient calibration file; e.g. a calibration file too much influenced by the shift in normal forces due to control actions of the suspension system.

After some driving on a plane road the air suspension will adjust back to normal with equal force on all wheels and the misleading calibration values may potentially lead to robustness problems and false alarms.

Now, referring to the drawings again, FIG. 1 schematically illustrates a principle system arrangement according to the present invention, particularly in form an tire pressure deviation (TPD) warning system 2.

The TPD warning system 2 may for example be a hardware and/or software component, which is integrated in an electronic control unit (e.g. ECU) of a vehicle. The system 2 obtains so-called vehicle data by means of an interface 4, which may be—in the case of an at least partially software based implementation—an application program interface (API). The vehicle data may include vehicle signals from the vehicle CAN bus e.g. describing the vehicle condition. The vehicle data may (further) include measuring data, information, signals and the like directly obtained and/or indirectly derived from vehicle's sensors, such as rotational speed sensors (as existent in the vehicle's ABS), which indicate angular velocities of rotating wheels and tires, respectively.

In particular, vehicle data at least related to or directly and/or indirectly indicating suspension condition and/or operation are of interest insofar as such vehicle data are used as basis for compensating tire pressure monitoring with inspection to (possible) import(s) of suspension on tire pressure.

Example for vehicle data include, e.g., at least one of pressure in a suspension leg or suspension means acting on a wheel/tire, suspension stiffness, suspension height information, information on control measures (actions, operation, etc.) concerning modifications (current and/or future) of suspension conditions or characteristics (e.g. in semi-active or active suspension systems) and suspension operation to control vehicle position (e.g. level) to, e.g. lower/raise the vehicle in the area of at least one wheel/tire.

Further, suspension related vehicle data may include information from means including at least one of a gyroscope and an accelerometer, which provide, e.g., two dimensional or three dimensional information on vehicle position, movement, condition, etc. resulting from (current) suspension characteristics.

Also, information indicating positioning, orientation and the like of headlight(s) of the vehicle may be used in indicate suspension condition(s) and/or characteristics (e.g. in the case of a heavy load in the vehicle's trunk headlights may be differently positioned as compared to an unloaded situation; is active headlight systems, whose head lights are moved in dependence of driving situations (e.g. in curves), may indicate suspension conditions).

Vehicle data may be (also) indicative of ambient temperature, temperature of an engine of the vehicle, wheel/tire angular velocity, wheel/tire rotational speed, engine torque of an engine of the vehicle, torque acting on the at least one tire, engine speed of an engine of the vehicle, yaw rate of the vehicle, speed of the vehicle, lateral and/or longitudinal acceleration of the vehicle, steering wheel angle of a steering wheel of the vehicle, of a driving condition of the vehicle, particularly a braking condition, gear shift of the vehicle being in progress and an active control device of the vehicle being actively operating.

Any of such data may be used by units for determining tire pressure indicating data, which units are described below. However, any of such vehicle data may also indicate—directly or indirectly—suspension related information that might influence tire pressure.

To provide such vehicle data, an ECU and/or sensors of the vehicle may be used. For example, gyroscope sensors, accelerator sensors, head light position sensors, temperature sensor(s), yaw rate sensor(s), torque sensor(s), speed sensor(s), accelerator sensor(s), and/or sensors indicating accelerator pedal, clutch pedal and/or braking pedal position(s) my be employed to acquire vehicle data and/or to perform measurements on the basis of which vehicle data may be derived.

According to the present invention, any type of suspension (system) is envisaged, for example, air suspension, magnet resistive suspension, (gas) hydraulic suspension, (hydro)pneumatic suspension and combustions thereof.

The vehicle data may directly provided to units of system 2 and/or may be stored in a memory unit 6 for later use. A diagnosis control unit 8 performs internal system and input signal checks and sets system status and error codes. If a severe error occurs, this unit can disable the system 2.

Obtained vehicle data may be input to a pre-processing unit 10, which may process (e.g. filters) vehicle data, for example, to remove disturbances and offsets, and may pre-compute vehicle data such that they can be used by other system parts.

According to the described embodiments, interface 4, memory unit 6 and pre-processing unit 10 may be considered as implementation of the step of and/or means for obtaining at least one vehicle data.

Signals output by pre-processing unit 10 are input to a unit for roll radius based tire pressure monitoring, here exemplarily in form of a wheel radius analysis (WRA) unit 12, and/or a wheel spectrum analysis (WSA) unit 14. According to the embodiments described here, WRA unit 12 and a WSA unit 14 represent an implementation of the step of determining tire pressure indicating data and/or as means for determining tire pressure indicating data.

To this end, WRA unit 12 and a WSA unit 14 will be provided vehicle data (unprocessed and/or processed by pre-processing unit 10) at least indicating wheel/tire angular velocity and/or wheel/tire rotational speed.

Further vehicle signals may be related to wheel/tire angular velocity "energy", yaw rate, yaw rate from wheel/tire velocity, engine torque, braking in progress, reverse driving in progress, active control in progress, vehicle speed, longitudinal acceleration, lateral acceleration, wheel slip, normalized traction force, gear shift in progress, data quality indicators (dynamic driving, slip variance, etc.), ambient temperature and vehicle status.

In some embodiments, WRA unit 12 and WSA unit 14 may be further provided data indicating, e.g., special driving conditions (e.g. driving with snow chains, on rough roads, on oval track and in a roundabout etc.). Such data may be generated by a dynamic state detector 16 based on vehicle data from interface 4, memory 6 and/or pre-processing unit 10. Thus, data from dynamic state detector 16 are here also referred to as vehicle data as they are derived there from.

Wheel radius analyses as executed in the WRA unit 12 are based on the fact that the wheel speed of a wheel depends on the respective wheel radius: the wheel speed increases with decreasing wheel radius. Changes in the wheel radius contain information about changes in the tire pressure of the corresponding wheels, but may also reflect, e.g., vehicle load changes and surface changes or react on driving forces (acceleration, braking, forces in curves etc.).

According to the described embodiments, WRA unit 12 may be considered as implementation of the step of and/or means for determining relative tire pressure deviation data for at least two tires. As described further below, suspension related compensation may be then carried out to achieve suspension compensated tire pressure deviation data for the at least two tires.

Based on the wheel angular velocity signals, WSA unit 14 detects changes in the spectral properties of each of the four wheel angular velocity signals. The tire pressure has significant influence on the characteristics of the spectrum of the angular velocity signal; however, further conditions (e.g. driving situation, road surface and temperature) may also have an impact on the angular velocity signal spectrum and may be therefore considered.

In further embodiments, WSA unit 14 may use DFT-based is approach(es) and/or method(s) to determine wheel/tire spectrum.

In any case, WSA unit 14 may detect changes in tire pressure for each wheel individually, for example by calculating a parametric model of the wheel/tire velocity spectrum and using the parameters of this model to calculate a spectral shape factor that condenses the different pressure dependent features of the spectrum into one single scalar quantity.

According to the described embodiments, WSA unit 14 may be considered as implementation of the step of and/or means for determining individual tire pressure deviation data for the at least one tire. As described further below, suspension related compensation may be then carried out to achieve suspension compensated tire pressure deviation data for each of the at least one tire.

Tire pressure indicating data may provided by WRA unit 12 only or by WSA unit 14 only or by both WRA unit 12 and WSA unit 14. According to the present invention, individual tire pressure deviation data may be—optionally or in addition—generated on the basis of correlation analysis such as, e.g. disclosed in WO 2005/005993 A1, the entire content of which being incorporated in the present disclosure by reference.

In such cases and assuming a vehicle having at least one pair of a front and a rear wheel being spaced by a wheel spacing, front wheel/tire speed and rear wheel/tire speed information, which indicates time dependent behavior of the front wheel/tire speed and rear wheel/tire speed, is determined. Then, the front wheel/tire speed and rear wheel/tire speed information is correlated in order to determine a specific correlation feature indicative of the time delay between the front wheel and rear wheel speed signals. On the basis of the correlation feature and the wheel spacing, a velocity of the vehicle may be determined.

A combination/compensation unit 18 obtains data from WRA unit 12 and/or WSA unit 14 and from interface 4, memory unit 6 and/or pre-processing unit 10. According to the described embodiments, combination/compensation unit 18 can be considered as implementation of the step of determining tire pressure deviation data and/or means for determining tire pressure deviation data.

More specifically, data provided to combination/compensation unit 18 include tire pressure indicating data of at least one of WRA unit 12 and WSA unit 14. Such data will be used to determine tire pressure deviation data indicative of tire pressure deviation condition(s) for the vehicle tire. To this end, combination/compensation unit 18 may also use data indicating, e.g., special driving conditions (e.g. driving with snow chains, on rough roads, on oval track and in a roundabout etc.) provided by dynamic state detector 16 and/or further vehicle data.

In general, combination/compensation unit 18 determines, based on input data, tire pressure deviation condition(s) for each tire separately or for at least two tires together. In embodiments not illustrated, combination/compensation unit 18 determines whether tire pressure indicating data indicate a deviation from a preset, desired and/or required tire pressure. To this end, combination/compensation unit 18 may additionally take into account further input data, such as data representing a current driving situation, since such data may influence a decision whether an inappropriate tire pressure deviation exists. Such determination(s) may use threshold comparison(s). Then, an inappropriate tire pressure deviation may be ascertained in the case tire pressure indicating data violate an upper and/or lower threshold (e.g. maximally and minimally, respectively, allowable tire pressure).

If an inappropriate tire pressure deviation condition is detected, combination/compensation unit 18 may generate warning data, enable a warning signal and the like to inform about the inappropriate tire pressure deviation condition.

Such warning information may be coupled, via an interface 20, to an ECU of the vehicle, which in turn may initiate measures suitable in view of the current tire pressure deviation condition (e.g. active control measures for reducing speed, reducing acceleration and/or brake forces and/or torques for the respective tire, etc.; informing a driver of the vehicle by visual information, warning lights, speech and/or sound output). Interface 20 may be integrally embodied with interface 4 or may provided separately.

In addition or as alternative, warning information may by forwarded to a warning unit (not shown) that performs functions as set forth above for an ECU and/or communicates with an ECU to inform about the inappropriate tire pressure deviation condition. In the case a warning unit is comprised by system 2, communication with external devices may accomplished via interface 20. Warning information may be also stored for later analyses.

According to the described embodiments, combination/compensation unit 18 also provides for suspension related compensation and can be therefore considered to implement the step of determining suspension related data and the step of suspension related compensating and/or to provide means for determining suspension related data and means for suspension related compensating. In further embodiments, suspension related data determination and/or suspension related compensation may be accomplished by one or more separate units.

For suspension related compensation, combination/compensation unit 18 may receive any of the above-mentioned vehicle data and/or information derived there from on the basis of which suspension related data can be determined. Suspension related data include any information that may be used to compensation suspension influence(s) directly and/or indirectly affecting tire pressure deviation data.

In some embodiments, suspension related data may indicate that suspension related compensation is, e.g., not feasible, not possible, not desired, unreliable etc. For example, one or more suspension conditions may be defined for which not suspension related compensation should be carried out. In the case such a suspension condition is detected, suspension related compensation may be interrupted or paused as long as that suspension condition is prevailing. When the suspension condition is left, suspension related compensation is resumed again. To this end, the suspension related compensation data may include respective information, such as, information indicating to disable suspension related compensation and to enable suspension related compensation, respectively. Such information may be provided to one, several or all components of system 2 in order to accordingly disable and enable its or their, respectively, operation.

Given that height info and/or pressure info is available from the vehicle's suspension means (e.g. an air suspension), roll radius based indirect tire pressure monitoring can be adjusted to the applied normal force to each wheel. In this way, the system can differentiate between reduced roll radius due to a pressure deviation (e.g. loss of air) and reduced roll radius due to a higher and/or lower pressure on the tire effected by the suspension means. This can also be used for compensating the algorithm when driving with heavy load in order to avoid false warnings.

To improve robustness, roll radius based indirect tire pressure monitoring may be (also) compensated with respect to (e.g. unexpected) suspension pressure differences between wheels/tires and/or roll radii changes caused by load changes.

Now, as an example, suspension compensation with respect to wheel/tire radii parameters is described.

In case no suspension compensation is performed wheel/tire radii parameters $WRA_{uncomp}$ may be calculated by:

$$WRA_{XZ} = \frac{R_{RL} - R_{FL}}{R_0}$$

$$WRA_{XR} = \frac{R_{RR} - R_{FR}}{R_0}$$

$$WRA_{YF} = \frac{R_{FL} - R_{FR}}{R_0}$$

$$WRA_{YR} = \frac{R_{RL} - R_{RR}}{R_0}$$

wherein $WRA_{uncomp}$ indicates un-compensated tire radius; $WRA_{XZ}$, $WRA_{XR}$, $WRA_{YF}$ and $WRA_{YR}$ are illustrated in FIG. 2; r indicates tire; and the indices fl, fr, rl and rr indicate the front left wheel/tire (fl), front right wheel/tire (fr), rear left wheel/tire (rl) and rear right wheel/tire (rr), respectively.

In the case suspension compensation is based on pressure measurement, a general compensation for roll radius based indirect tire pressure monitoring may result in suspension compensated wheel/tire radii parameters, which may be obtained by $$WRA_{xy\text{-}comppr} = WRA_{xy\text{-}uncomp} - f(\text{suspension related data}),$$

wherein $WRA_{xy\text{-}comppr}$ indicates tire radius suspension compensated based on suspension pressure, $WRA_{xy\text{-}uncomp}$ indicates un-compensated tire radius and f(suspension related data) indicates a function describing effect(s) of suspension pressure on the radius of a respective wheel/tire.

More particular, in case of suspension compensation in roll radius based indirect tire pressure monitoring using air suspension pressure compensated wheel/tire radii parameters may be obtained by $$WRA_{xy\text{-}comppr} = WRA_{xy\text{-}uncomp} - \alpha * P_{xy} * A$$

$$P_{xy} = [P_{fl} P_{fr} P_{rl} P_{rr}]$$

wherein $WRA_{xy\text{-}comppr}$ indicates tire radius suspension compensated based on suspension pressure, $WRA_{xy\text{-}uncomp}$ indicates un-compensated tire radius, $\alpha$ is a constant, A is an example of a compensation matrix and P indicates current pressures in respective suspension means (e.g. suspension cylinder bar).

The indices fl, fr, rl and rr indicate suspension pressures for the front left wheel/tire (fl), front right wheel/tire (fr), rear left wheel/tire (rl) and rear right wheel/tire (rr), respectively.

Then, the following matrixes may be established:

$$WRA_{XY} = \begin{bmatrix} WRA_{YF} \\ WRA_{YR} \\ WRA_{XL} \\ WRA_{XR} \end{bmatrix}, \quad A = \begin{bmatrix} -1 & 0 & 1 & 0 \\ 1 & 0 & 0 & 1 \\ 0 & -1 & -1 & 0 \\ 0 & 1 & 0 & -1 \end{bmatrix}$$

In the case of suspension compensation by height measurement, a general compensation for roll radius based indirect tire pressure monitoring may result in suspension compensated tire radii parameters may be obtained by $$WRA_{xy\text{-}comph} = WRA_{xy\text{-}uncomp} - f(\text{suspension related data}),$$

wherein $WRA_{xy\text{-}comph}$ indicates tire radius suspension compensated based on suspension height information, $WRA_{xy\text{-}uncomp}$ indicates un-compensated tire radius and f(suspension related data) indicates a function describing effect(s) of suspension height on the radius of a respective wheel/tire.

In particular, in case of suspension compensation in roll radius based indirect tire pressure monitoring using air suspension pressure compensated wheel/tire radii parameters, which may be obtained by $$WRA_{xy\text{-}comph} = WRA_{xy\text{-}uncomp} \alpha * H_{xy} * A$$

$$H_{xy} = [H_{fl} H_{fr} H_{rl} H_{rr}]$$

wherein $WRA_{xy\text{-}comph}$ indicates tire radius suspension compensated based on suspension height information, $WRA_{xy\text{-}uncomp}$ indicates un-compensated tire radius, $\alpha$ is a constant, A is an example of a compensation matrix and H indicates heights at respective suspension means (e.g. (air) suspension cylinder bars).

The indices fl, fr, rl and rr indicate suspension pressures for the front left wheel/tire (fl), front right wheel/tire (fr), rear left wheel/tire (rl) and rear right wheel/tire (rr), respectively.

Then, the following matrixes may be established:

$$WRA_{XY} = \begin{bmatrix} WRA_{YF} \\ WRA_{YR} \\ WRA_{XL} \\ WRA_{XR} \end{bmatrix}, \quad A = \begin{bmatrix} -1 & 0 & 1 & 0 \\ 1 & 0 & 0 & 1 \\ 0 & -1 & -1 & 0 \\ 0 & 1 & 0 & -1 \end{bmatrix}$$

Now, as a further example, suspension compensation with respect to wheel/tire spectrum parameters is described.

In case no suspension compensation is performed wheel/tire spectrum parameters WSA may be calculated by:

$$WSA = \begin{bmatrix} WSA_{FL} \\ WSA_{FR} \\ WSA_{RL} \\ WSA_{RR} \end{bmatrix}$$

wherein WSA indicates un-compensated wheel/tire spectrum; and $WSA_{fl}$, $WRA_{fr}$, $WSA_{rl}$ and $WSA_{rr}$ indicate wheel/tire spectrum of the the front left wheel/tire (fl), front right wheel/tire (fr), rear left wheel/tire (rl) and rear right wheel/tire (rr), respectively.

In the case suspension compensation is based on pressure measurement, a general compensation for wheel/tire spectrum based tire pressure monitoring may result in suspension compensated wheel/tire spectrum parameters, which may be obtained by $$WSA_{comppr} = WSA_{uncomp} - f(\text{suspension related data}),$$

wherein $WSA_{comppr}$ indicates wheel/tire spectrum suspension compensated based on suspension pressure, $WSA_{uncomp}$ indicates un-compensated wheel/tire spectrum and f(suspension related data) indicates a function describing effect(s) of suspension pressure on the wheel/tire spectrum of a respective wheel/tire.

More particular, in case of suspension compensation in wheel/tire spectrum based indirect tire pressure monitoring using air suspension pressure compensated wheel/tire spectrum parameters may be obtained by $$WSA_{comppr} = WSA_{uncomp} \alpha * P_{xy} * A$$

$$P_{xy} = [P_{fl} P_{fr} P_{rl} P_{rr}]$$

wherein $WSA_{comppr}$ indicates wheel/tire spectrum suspension compensated based on suspension pressure, $WSA_{uncomp}$ indicates un-compensated wheel/tire spectrum, $\alpha$ is a constant, A is an example of a compensation matrix and P indicates current pressures in respective suspension means (e.g. suspension cylinder bar).

The indices fl, fr, rl and rr indicate suspension pressures for the front left wheel/tire (fl), front right wheel/tire (fr), rear left wheel/tire (rl) and rear right wheel/tire (rr), respectively.

Then, the following matrixes may be established:

$$WSA = \begin{bmatrix} WSA_{FL} \\ WSA_{FR} \\ WSA_{RL} \\ WSA_{RR} \end{bmatrix}, A = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In the case of suspension compensation by height measurement, a general compensation for wheel/tire spectrum based indirect tire pressure monitoring may result in suspension compensated wheel/tire spectrum parameters may be obtained by $$WSA_{comph} = WSA_{uncomp} - f(\text{suspension related data}),$$

wherein $WSA_{comph}$ indicates wheel/tire spectrum suspension compensated based on suspension height information, $WSA_{uncomp}$ indicates un-compensated wheel/tire spectrum and f(suspension related data) indicates a function describing effect(s) of suspension height on the wheel/tire spectrum of a respective wheel/tire.

In particular, in case of suspension compensation in wheel/tire spectrum based indirect tire pressure monitoring using air suspension pressure compensated wheel/tire spectrum parameters, which may be obtained by $$WSA_{comph} = WSA_{uncomp} \alpha * H_{xy} * A$$

$$H_{xy} = [H_{fl} H_{fr} H_{rl} H_{rr}]$$

wherein $WSA_{comph}$ indicates wheel/tire spectrum suspension compensated based on suspension height information, $WSA_{uncomp}$ indicates un-compensated wheel/tire spectrum, α is a constant, A is an example of a compensation matrix and H indicates heights at respective suspension means (e.g. (air) suspension cylinder bars).

The indices fl, fr, rl and rr indicate suspension pressures for the front left wheel/tire (fl), front right wheel/tire (fr), rear left wheel/tire (rl) and rear right wheel/tire (rr), respectively.

Then, the following matrixes may be established:

$$WSA = \begin{bmatrix} WSA_{FL} \\ WSA_{FR} \\ WSA_{RL} \\ WSA_{RR} \end{bmatrix}, A = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The above embodiments relating to suspension compensation with respect to roll radius and wheel/tire spectrum may used alone or in combination with each other. In embodiments combining these suspension compensations modes, it is contemplated to use them continuously in parallel, alternating and/or in parallel during predefined periods of time.

Suspension compensation may be (also) performed by compensating tire pressure deviation data.

In such embodiments, suspension compensation may be carried out on tire pressure deviation data, which have been derived from suspension uncompensated tire pressure indicating data (e.g. uncompensated tire pressure indicating data obtained from roll radius based indirect tire pressure monitoring and/or and wheel/tire spectrum based indirect tire pressure monitoring).

In such embodiments, it is also contemplated to carry out suspension compensation on tire pressure deviation data, which have been derived from suspension compensated tire pressure indicating data (e.g. compensated tire pressure indicating data obtained from roll radius based indirect tire pressure monitoring and/or and wheel/tire spectrum based indirect tire pressure monitoring, e.g., compensated as described above).

In cases where suspension compensation is provided for both tire pressure indicating data and tire pressure deviation data, vehicle data used for suspension compensation of tire pressure indicating data and vehicle data used for suspension compensation of tire pressure deviation data may differ.

Results of tests for a vehicle's air suspension system using the present invention are illustrated in FIGS. 3 to 6.

FIG. 3 illustrates data for tire pressure monitoring without suspension related compensation and FIG. 4 illustrates data for tire pressure monitoring with suspension related compensation based on suspension pressure. In the case of FIG. 4 suspension pressure was measured continuously.

The upper graphs in FIGS. 3 and 4 illustrate changes in vehicle load over time. The middle graph of FIG. 3 illustrates tire radius values derived from roll radius based indirect tire pressure monitoring without suspension related compensation, while the middle graph of FIG. 4 illustrates tire radius values derived from roll radius based indirect tire pressure monitoring with suspension related compensation based on suspension pressure. Compensation in the latter case may be performed as set forth above with respect tire to suspension pressure based suspension related compensation.

The lower graph of FIG. 3 illustrates tire pressure deviation information for the front left tire (FL), front right tire (FR), rear left tire (RL) and rear right tire (RR).

The lowest line in the lower graph of FIG. 3 indicates whether a malfunction (Mal) is prevailing or whether tire pressure monitoring is properly working, respectively. The uniform appearance of this lowest line indicates that tire pressure monitoring is properly working (no malfunction).

The darker portion in the line for tire pressure deviation information for the front left tire (FL) indicates a tire pressure deviation actually resulting from tire pressure loss.

The darker portions in the lines for tire pressure deviation information for the rear left tire (RL) and rear right tire (RR) at the graph's left side indicate tire pressure deviation above an acceptable level (e.g. too high tire pressure deviation). The dotted portion of the line for tire pressure deviation information for rear right tire (RR) indicates tire pressure deviation above a critical level (e.g. tire pressure deviation is not too high but worth to consider).

However, the tire pressure deviation above an acceptable level and above a critical level do not result from actual tire pressure deviation but from load changes shown in the upper graph of FIG. 3.

The lower graph of FIG. 4 illustrates tire pressure deviation information for the front left tire (FL), front right tire (FR), rear left tire (RL) and rear right tire (RR).

The lowest line in the lower graph of FIG. 4 indicates whether a malfunction (Mal) is prevailing or whether tire pressure monitoring is properly working, respectively. The uniform appearance of this lowest line indicates here also that tire pressure monitoring is properly working (no malfunction).

In contrast to the case of FIG. 3, tire pressure deviation information in the case of FIG. 4 does neither indicate tire pressure deviation above an acceptable level nor indicate tire pressure deviation above a critical level for tire that do not exhibit an actual tire pressure loss (i.e. rear left tire (RL) and rear right tire (RR)). This is indicated by the lines for tire having the same appearance.

However, tire pressure deviation resulting from actual tire pressure loss in the front left tire (FL) is still detected (as indicated by the darker portion in the line for tire pressure deviation information front left tire (FL)). As set forth above, also in this case tire pressure monitoring is properly working (no malfunction indicated in the lowest line of the lower graph of FIG. 4).

As a result, tire pressure variations resulting from load changes shown in the upper graph of FIG. 4 are compensated, whereby robustness is apparently improved, while actual tire pressure loss may be still reliable detected.

FIG. 5 substantially corresponds with FIG. 3. Therefore, the above observations concerning FIG. 3 also apply to FIG. 5.

FIG. 6 illustrates data for tire pressure monitoring with suspension related compensation based on suspension pressure, wherein—in contrast to the case of FIG. 4—suspension pressure was measured only during periods of time where suspension control is active.

The above observations concerning the upper, middle and lower graphs of FIG. 4 correspondingly apple to the graphs of FIG. 6.

As can be seen, tire pressure deviation information in the case of FIG. 6 does also neither indicate tire pressure deviation above an acceptable level nor indicate tire pressure deviation above a critical level for tire that do not exhibit an actual tire pressure loss (i.e. rear left tire (RL) and rear right tire (RR)).

However, again tire pressure deviation resulting from actual tire pressure loss in the front left tire (FL) is still detected (as indicated by the darker portion in the line for tire pressure deviation information front left tire (FL)).

As a result, tire pressure variations resulting from load changes may also successfully compensated if compensation is performed during periods of time where suspension control is active, while actual tire pressure loss may be still reliable detected. Again, tire pressure monitoring is properly working (no malfunction indicated in the lowest line of the lower graph of FIG. 4) even in this case.

FIG. 7 illustrates an example of suspension compensated tire pressure monitoring wherein information concerning positioning of vehicle headlights is used as basis. Information on headlight positioning may be, for example, obtained from (controlled) support means for headlights, control means for headlight positioning (e.g. input means, e.g. switches, buttons, knobs etc.) for controlling/adjusting headlight positions for different vehicle load conditions and/or sensors used for headlight positioning.

With reference to the latter example, it may be required (e.g. by national legal/technical regulations) to use sensors, which detect current vehicle levels. For example, such sensors may detect whether a heavy load in the vehicle's trunk results in an inclined level of the vehicle's longitudinal axis (rear axel is lower than front axel). Such sensors may be, e.g., used for Xenon headlight systems.

In such cases, suspension compensation based on headlight positioning related sensor information a general compensation for roll radius based indirect tire pressure monitoring may result in suspension compensated tire radii parameters, which may be obtained by $$WRA_{xy\text{-}comphp} = WRA_{xy\text{-}uncomp} - f(\text{suspension related data}),$$

wherein $WRA_{xy\text{-}comphp}$ indicates tire radius suspension compensated based on headlight positioning related sensor information, $WRA_{xy\text{-}uncomp}$ indicates un-compensated tire radius and f(suspension related data) indicates a function describing effect(s) on the radius of a respective wheel/tire as indicated by headlight positioning related sensor information.

More specifically, compensated wheel/tire radii parameters may be obtained by $$WRA_{x\text{-}comphp} = WRA_{x\text{-}uncomp} - \alpha * H_x * A$$

$$H_x = [H_f H_r]$$

wherein $WRA_{xy\text{-}comphp}$ indicates tire radius suspension compensated based on headlight positioning related sensor information, $WRA_{xy\text{-}uncomp}$ indicates un-compensated tire radius, $\alpha$ is a constant, A is an example of a compensation matrix and $H_f$ and $H_r$ indicate height of front axel and rear axel respectively.

Then, the following matrixes may be established:

$$WRA_X = \begin{bmatrix} WRA_{XL} \\ WRA_{XR} \end{bmatrix}, A = \begin{bmatrix} 1 & 1 \\ -1 & -1 \end{bmatrix}$$

FIG. 7 illustrates data for tire pressure monitoring with suspension related compensation based on headlight positioning related sensor information.

The most upper graph in FIG. 7 illustrates changes in vehicle load over time. The second upper graph of FIG. 7 illustrates measured axel levels (in mm) for a front axel (upper curve in this graph) and rear axel (lower curve in this graph).

The third upper graph in FIG. 7 illustrates tire radius values derived from roll radius based indirect tire pressure monitoring with suspension related compensation based on headlight positioning related sensor information reflecting said load changes and resulting axel levels.

The lowest graph of FIG. 7 illustrates tire pressure deviation information for the front left tire (FL), front right tire (FR), rear left tire (RL) and rear right tire (RR). The uniform appearances of these lines indicate that in no tire tire pressure deviation is detected.

The lowest line in the lowest graph of FIG. 7 indicates whether a malfunction (Mal) is prevailing or whether tire pressure monitoring is properly working, respectively. The uniform appearance of this line indicates that tire pressure monitoring is properly working (no malfunction).

In more enhanced headlight systems it is possible to position headlights also according to current driving situations, such as curve driving, uphill and/or downhill driving, etc. For such positioning, also sensors may be used to detect current driving situations and associated vehicle conditions (level) in order to position the headlights accordingly. Information from such sensors may also provide information on suspension condition(s) and may be therefore also used for compensation according to the present invention.

Among vehicle data (for example those mentioned above), which provide information from which suspension conditions, properties, operation etc. may be derived, one type of vehicle data taken alone or two and more types of different vehicle data taken in combination may be used for compensation according to the present invention. With reference to the examples described with reference to FIGS. 3 to 7, for example, continuous suspension compensation or suspension compensation during periods of time where suspension control is active may be used alone or suspension compensation based on information on headlight positioning may be used alone or these suspension compensations may be used in combination.

What is claimed is:

1. An indirect tire pressure monitoring method of detecting tire pressure deviation in tires of a vehicle, comprising:
   determining tire pressure indicating data indicative of a tire pressure condition of at least one tire of a vehicle; and
   determining tire pressure deviation data indicative of a tire pressure deviation condition in the at least one tire on the basis of the tire pressure indicating data;
   characterized by:
   obtaining at least one vehicle data provided by a controlling and/or monitoring device of the vehicle;
   determining suspension related data on the basis of the at least one vehicle data; and
   suspension related compensating on the basis of the suspension related data such that suspension compensated tire pressure deviation data is achieved,
   wherein the suspension related data includes at least one of (i) a current pressure in a suspension acting on the least one tire, and (ii) a height of the suspension acting on the least one tire, and
   wherein the at least one vehicle data includes at least one of
   vehicle data indicative of suspension stiffness acting on at least one of the at least one tire;
   vehicle data indicative of operation of a semi-active or active suspension control system of the vehicle;
   vehicle data indicative of at least one of a lateral acceleration and a longitudinal acceleration of the vehicle;
   vehicle data indicative of a yaw rate of the vehicle;
   vehicle data indicative of a speed of the vehicle;
   vehicle data indicative of a steering wheel angle of a steering wheel of the vehicle;
   vehicle data indicative of at least one of positioning, orientation and emission direction of at least one head light of the vehicle;
   vehicle data indicative of a braking condition of the vehicle;
   vehicle data indicative that a braking system of the vehicle is operating;
   vehicle data indicative of brake pressure;
   vehicle data indicative that at least one active control device of the vehicle is active;
   vehicle data indicative of ambient temperature;
   vehicle data indicative of an engine torque of an engine of the vehicle;
   vehicle data indicative of a torque acting on the at least one tire;
   vehicle data indicative of wheel slip related to the at least one tire;
   vehicle data indicative of an engine speed of an engine of the vehicle; and
   vehicle data indicative that a gear shift of the vehicle is in progress.

2. The method of claim 1, wherein suspension related compensating comprises suspension related compensating the tire pressure indicating data on the basis of the suspension related data such that suspension compensated tire pressure deviation data is achieved; and/or
   wherein
      determining tire pressure deviation data comprises determining individual tire pressure deviation data for each of the at least one tire on the basis of wheel spectrum analysis; and
      suspension related compensating comprises suspension related compensating with respect to each of individual tire pressure deviation data on the basis of the suspension related data such that suspension compensated tire pressure deviation data for each of the at least one tire is achieved; and/or
   wherein
      determining tire pressure deviation data comprises determining relative tire pressure deviation data for at least two tires of the vehicle on the basis of roll radius based indirect tire pressure monitoring; and
      suspension related compensating comprises suspension related compensating with respect to the relative tire pressure deviation data on the basis of the suspension related data to achieve suspension compensated tire pressure deviation data for the at least two tires; and/or
   wherein
      determining tire pressure deviation data comprises determining relative tire pressure deviation data for at least two tires of the vehicle on the basis of correlation analysis; and
      suspension related compensating comprises suspension related compensating with respect to the relative tire pressure deviation data on the basis of the suspension related data to achieve suspension compensated tire pressure deviation data for the at least two tires; and/or
   wherein the at least one vehicle data includes at least one of
   vehicle data indicative of suspension height information related to at least one of the at least one tire;
   vehicle data indicative of at least one of current and future control measures of extension and/or height of suspension acting on at least one of the at least one tire;
   vehicle data indicative of suspension pressure and/or force acting on at least one of the at least one tire;
   vehicle data indicative of a driving condition of the vehicle; and/or wherein determining the suspension related data comprises computing the at least one vehicle data to calculate or estimate the suspension related data; and/or wherein obtaining the at least one vehicle data comprises obtaining vehicle data of at least one of:
      a 3D position sensor;
      a velocity sensor;
      an acceleration sensor;
      a wheel/tire sensor;
      a yaw rate sensor;
      a torque sensor;
      a suspension sensor; and
      temperature sensor; and/or
   wherein suspension related compensating comprises suspension related compensating the at least one vehicle data on the basis of the suspension related data; and/or
   wherein suspension related compensating comprises suspension related compensating the tire pressure indicating data on the basis of the suspension related data; and/or
   wherein suspension related compensating comprises suspension related compensating the tire pressure deviation data itself on the basis of the suspension related data; and/or
   further comprising comparing the tire pressure deviation data with deviation threshold data to determine whether the tire pressure deviation exceeds at least one predetermined deviation related threshold, preferably further comprising correcting the deviation threshold data on the basis of the suspension related data; and/or further comprising pausing at least one indirect tire pressure monitoring operation when the suspension related data indicates a suspension condition outside a predefined range and resuming the at least one indirect tire pressure monitoring operation when the suspension related data indicates a suspension condition within the predefined range.

3. An indirect tire pressure monitoring system for detecting tire pressure deviation in tires of a vehicle, comprising:

a roll radius based tire pressure monitoring unit adapted to determine tire pressure indicating data indicative of a tire pressure condition of at least one tire of a vehicle, and to determine tire pressure deviation data indicative of a tire pressure deviation condition in the at least one tire on the basis of the tire pressure indicating data;

characterized by:

an interface adapted to obtain at least one vehicle data provided by a controlling and/or monitoring device of the vehicle;

a combination/compensation unit adapted to determine suspension related data on the basis of the at least one vehicle data, and adapted to suspension related compensate on the basis of the suspension related data such that suspension compensated tire pressure deviation data is achieved, wherein the combination/compensation unit is adapted to determine suspension related data, and wherein the suspension related data includes at least one of (i) a current pressure in a suspension acting on the least one tire, and (ii) a height of the suspension acting on the least one tire, wherein the interface is adapted to include at least one input for obtaining, as the least one vehicle data, at least one of vehicle data indicative of suspension height information related to at least one of the at least one tire;

vehicle data indicative of suspension stiffness acting on at least one of the at least one tire;

vehicle data indicative of at least one of current and future control measures of extension and/or height of the suspension acting on at least one of the at least one tire;

vehicle data indicative of operation of a semi-active or active suspension control system of the vehicle;

vehicle data indicative of suspension pressure and/or force acting on at least one of the at least one tire;

vehicle data indicative of at least one of a lateral acceleration and a longitudinal acceleration of the vehicle;

vehicle data indicative of a yaw rate of the vehicle;

vehicle data indicative of a speed of the vehicle;

vehicle data indicative of a steering wheel angle of a steering wheel of the vehicle;

vehicle data indicative of at least one of positioning, orientation and emission direction of at least one head light of the vehicle;

vehicle data indicative of a braking condition;

vehicle data indicative that a braking system of the vehicle is operating;

vehicle data indicative of brake pressure;

vehicle data indicative that at least one active control device of the vehicle is active;

vehicle data indicative of ambient temperature;

vehicle data indicative of an engine torque of an engine of the vehicle;

vehicle data indicative of a torque acting on the at least one tire;

vehicle data indicative of wheel slip related to the at least one tire;

vehicle data indicative of an engine speed of an engine of the vehicle; and vehicle data indicative that a gear shift of the vehicle is in progress; and/or wherein the combination/compensation unit is adapted to compute the at least one vehicle data to calculate or estimate the suspension related data; and/or wherein the interface is adapted to suspension related compensate the at least one vehicle data based on the suspension related data; and/or wherein the interface is adapted to obtain vehicle data of at least one of:

a 3D position sensor;

a velocity sensor;

an acceleration sensor;

a wheel/tire sensor;

a yaw rate sensor;

a torque sensor;

a suspension sensor; and temperature sensor; and/or wherein the combination/compensation unit is adapted to suspension related compensate the tire pressure indicating data on the basis of the suspension related data; and/or wherein the combination/compensation unit is adapted to suspension related compensate the tire pressure deviation data itself on the basis of the suspension related data; and/or wherein the combination/compensation unit is adapted to compare the tire pressure deviation data with deviation threshold data and adapted to determine, based on the comparison result, whether the tire pressure deviation condition exceeds at least one predetermined deviation related threshold; and/or wherein the combination/compensation unit is preferably adapted to correct the deviation threshold data on the basis of the suspension related data.

4. The system of claim 3, wherein the combination/compensation unit is adapted to suspension related compensate the tire pressure indicating data on the basis of the suspension related data such that suspension compensated tire pressure deviation data is achieved; and/or wherein the roll radius based tire pressure monitoring unit is adapted to determine individual tire pressure deviation data for each of the at least one tire on the basis of wheel spectrum analysis; and the combination/compensation unit is adapted to suspension related compensate with respect to the individual tire pressure deviation data on the basis of the suspension related data to achieve suspension compensated tire pressure deviation data for each of the at least one tire; and/or wherein the roll radius based tire pressure monitoring unit is adapted to determine relative tire pressure deviation data for at least two tires of the vehicle on the basis of roll radius based on indirect tire pressure monitoring; and the combination/compensation unit is adapted to suspension related compensate with respect to the relative tire pressure deviation data on the basis of the suspension related data to achieve suspension compensated tire pressure deviation data for the at least two tires together; and/or wherein
the combination/compensation unit is adapted to determine relative tire pressure deviation data for at least two tires of the vehicle on the basis of correlation analysis; and
the combination/compensation unit is adapted to suspension related compensate the tire pressure deviation data on the basis of the suspension related data to achieve suspension compensated tire pressure deviation data for at least two tires; and/or the interface is adapted to include at least one input for obtaining, as the least one vehicle data, at least one of
vehicle data indicative of suspension height information related to at least one of the at least one tire;
vehicle data indicative of at least one of current and future control measures of extension and/or height of suspension means acting on at least one of the at least one tire;
vehicle data indicative of suspension pressure and/or force acting on at least one of the at least one tire;
vehicle data indicative of a driving condition of the vehicle; and/or
wherein the combination/compensation unit is adapted to compute the at least one vehicle data to calculate or estimate the suspension related data; and/or
wherein the combination/compensation unit is adapted to suspension related compensate the at least one vehicle data based on the suspension related data; and/or
wherein the interface is adapted to obtain vehicle data of at least one of:
a 3D position sensor;
a velocity sensor;
an acceleration sensor;
a wheel/tire sensor;
a yaw rate sensor;
a torque sensor;
a suspension sensor; and
temperature sensor; and/or
wherein the combination/compensation unit is adapted to suspension related compensate the tire pressure indicating data on the basis of the suspension related data; and/or
wherein the combination/compensation unit is adapted to suspension related compensate the tire pressure deviation data itself on the basis of the suspension related data; and/or
wherein the combination/compensation unit is adapted to compare the tire pressure deviation data with deviation threshold data and is adapted to determine, based on the comparison result, whether the tire pressure deviation condition exceeds at least one predetermined deviation related threshold; and/or
wherein the combination/compensation unit is preferably adapted to correct the deviation threshold data on the basis of the suspension related data; and/or
wherein the combination/compensation unit is adapted to disable at least one of the roll radius based tire pressure monitoring unit, the interface, and the combination/compensation unit when the suspension related data indicates a suspension condition outside a predefined range and is adapted to enable at least one of the roll radius based tire pressure monitoring unit, the interface, and the combination/compensation unit when the suspension related data indicates a suspension condition within the predefined range.

5. A non-transitory computer program product for an indirect tire pressure monitoring for detecting tire pressure deviation in tires of a vehicle, the computer program product comprising program code for carrying out, when executed on a processing system:
determining tire pressure indicating data indicative of a tire pressure condition of at least one tire of a vehicle; and
determining tire pressure deviation data indicative of a tire pressure deviation condition in the at least one tire on the basis of the tire pressure indicating data; characterized by:
obtaining at least one vehicle data provided by a controlling and/or monitoring device of the vehicle;
determining suspension related data on the basis of the at least one vehicle data; and
suspension related compensating on the basis of the suspension related data such that suspension compensated tire pressure deviation data is achieved,
wherein the suspension related data includes at least one of (i) a current pressure in a suspension acting on the least one tire, and (ii) a height of the suspension acting on the least one tire, and
wherein the at least one vehicle data includes at least one of
vehicle data indicative of suspension stiffness acting on at least one of the at least one tire;
vehicle data indicative of operation of a semi-active or active suspension control system of the vehicle;
vehicle data indicative of at least one of a lateral acceleration and a longitudinal acceleration of the vehicle;
vehicle data indicative of a yaw rate of the vehicle;
vehicle data indicative of a speed of the vehicle;
vehicle data indicative of a steering wheel angle of a steering wheel of the vehicle;
vehicle data indicative of at least one of positioning, orientation and emission direction of at least one head light of the vehicle;
vehicle data indicative of a braking condition of the vehicle;
vehicle data indicative that a braking system of the vehicle is operating;
vehicle data indicative of brake pressure;
vehicle data indicative that at least one active control device of the vehicle is active;
vehicle data indicative of ambient temperature;
vehicle data indicative of an engine torque of an engine of the vehicle;
vehicle data indicative of a torque acting on the at least one tire;
vehicle data indicative of wheel slip related to the at least one tire;
vehicle data indicative of an engine speed of an engine of the vehicle; and
vehicle data indicative that a gear shift of the vehicle is in progress.

6. The non-transitory computer program product of claim 5, further comprising program code for carrying out, when executed on a processing
system, at least one of the alternatives of wherein suspension related compensating comprises suspension related compensating the tire pressure indicating data on the basis of the suspension related data such that suspension compensated tire pressure deviation data is achieved; and/or
wherein
determining tire pressure deviation data comprises determining individual tire pressure deviation data for each of the at least one tire on the basis of wheel spectrum analysis; and suspension related compensating comprises suspension related compensating with respect to each of individual tire pressure deviation data on the basis of the suspension related data such that suspension compensated tire pressure deviation data for each of the at least one tire is achieved; and/or wherein
  determining tire pressure deviation data comprises determining relative tire pressure deviation data for at least two tires of the vehicle on the basis of roll radius based indirect tire pressure monitoring; and
  suspension related compensating comprises suspension related compensating with respect to the relative tire pressure deviation data on the basis of the suspension related data to achieve suspension compensated tire pressure deviation data for the at least two tires; and/or wherein
  determining tire pressure deviation data comprises determining relative tire pressure deviation data for at least two tires of the vehicle on the basis of correlation analysis; and
  suspension related compensating comprises suspension related compensating with respect to the relative tire pressure deviation data on the basis of the suspension related data to achieve suspension compensated tire pressure deviation data for the at least two tires; and/or wherein the at least one vehicle data includes at least one of
  vehicle data indicative of suspension height information related to at least one of the at least one tire;
  vehicle data indicative of at least one of current and future control measures of extension and/or height of the suspension acting on at least one of the at least one tire;
  vehicle data indicative of suspension pressure and/or force acting on at least one of the at least one tire;
  vehicle data indicative of a driving condition of the vehicle; and/or wherein determining the suspension related data comprises computing the at least one vehicle data to calculate or estimate the suspension related data; and/or wherein obtaining the at least one vehicle data comprises obtaining vehicle data of at least one of:
  a 3D position sensor;
  a velocity sensor;
  an acceleration sensor;
  a wheel/tire sensor;
  a yaw rate sensor;
  a torque sensor;
  a suspension sensor; and
  temperature sensor; and/or wherein suspension related compensating comprises suspension related compensating the at least one vehicle data on the basis of the suspension related data; and/or wherein suspension related compensating comprises suspension related compensating the tire pressure indicating data on the basis of the suspension related data; and/or wherein suspension related compensating comprises suspension related compensating the tire pressure deviation data itself on the basis of the suspension related data; and/or further comprising comparing the tire pressure deviation data with deviation threshold data to determine whether the tire pressure deviation exceeds at least one predetermined deviation related threshold, preferably further comprising correcting the deviation threshold data on the basis of the suspension related data; and/or further comprising pausing at least one indirect tire pressure monitoring operation when the suspension related data indicates a suspension condition outside a predefined range and resuming the at least one indirect tire pressure monitoring operation-when the suspension related data indicates a suspension condition within the predefined range; and/or being stored on a computer-readable storage medium or in a computer-readable storage device.

\* \* \* \* \*